United States Patent
Provost et al.

(10) Patent No.: US 7,167,846 B2
(45) Date of Patent: Jan. 23, 2007

(54) SYSTEM, PROCESS AND SOFTWARE ARRANGEMENT FOR ASSISTING WITH A KNOWLEDGE DISCOVERY PROCESS

(75) Inventors: Foster Provost, New York, NY (US); Abraham Bernstein, New York, NY (US)

(73) Assignee: New York University, New York, NY (US)

( * ) Notice: Subject to any disclaimer, the term of this patent is extended or adjusted under 35 U.S.C. 154(b) by 464 days.

(21) Appl. No.: 10/450,098

(22) PCT Filed: Jan. 4, 2002

(86) PCT No.: PCT/US02/00545

§ 371 (c)(1),
(2), (4) Date: Oct. 20, 2003

(87) PCT Pub. No.: WO02/054272

PCT Pub. Date: Jul. 11, 2002

(65) Prior Publication Data

US 2004/0068476 A1      Apr. 8, 2004

Related U.S. Application Data

(60) Provisional application No. 60/259,780, filed on Jan. 4, 2001.

(51) Int. Cl.
  *G06F 15/18*    (2006.01)
  *G06G 7/00*     (2006.01)
(52) U.S. Cl. ........................................................ 706/6
(58) Field of Classification Search .............. 706/45–47
See application file for complete search history.

(56) References Cited

U.S. PATENT DOCUMENTS 5,701,400 A  *  12/1997  Amado ........................ 706/45

(Continued)

OTHER PUBLICATIONS

HACKER: human and computer knowledge discovered event rules for telecommunications fault management Sterritt, R.; Curran, E.P.; Hongzhi Song; Systems, Man and Cybernetics, 2002 IEEE International Conference on vol. 7, Oct. 6-9, 2002 p. 6 pp. vol. 7.*

(Continued)

*Primary Examiner*—Anthony Knight
*Assistant Examiner*—Michael B. Holmes
(74) *Attorney, Agent, or Firm*—Dorsey & Whitney LLP

(57) ABSTRACT

A process, system and computer software are provided to produce at least two solutions related to a knowledge discovery from data. In particular, the information regarding operators which are usable for the knowledge discovery of the data is received, and the solutions are generated. Each of the solutions includes at least one of the operators. An ability is provided to select at least one of the solutions so as to execute one or more procedures from the data. Each of the procedures is associated with the operator of the respective solution. In addition, it is possible to include a variable number of the operators in at least one (and possibly all) of the solutions. Also, it is possible to generate a code for at least one automatically-generated solution. In particular, access to the automatically-generated solution can be obtained with this solution that includes operators usable for the knowledge discovery of the data. Then, the code can be generated for associating one of the operators of the automatically-generated solution with another one of the operators of the automatically-generated solution.

79 Claims, 12 Drawing Sheets

U.S. PATENT DOCUMENTS

| | | | | |
|---|---|---|---|---|
| 5,787,425 | A | * | 7/1998 | Bigus .......................... 707/6 |
| 5,933,818 | A | * | 8/1999 | Kasravi et al. ............... 706/12 |
| 6,128,608 | A | | 10/2000 | Barnhill |
| 6,128,624 | A | * | 10/2000 | Papierniak et al. ...... 707/104.1 |
| 6,151,584 | A | * | 11/2000 | Papierniak et al. .......... 705/10 |
| 6,151,601 | A | * | 11/2000 | Papierniak et al. .......... 707/10 |
| 6,157,921 | A | | 12/2000 | Barnhill |
| 6,317,700 | B1 | * | 11/2001 | Bagne ....................... 702/181 |
| 6,484,155 | B1 | | 11/2002 | Kiss et al. |
| 6,633,882 | B1 | * | 10/2003 | Fayyad et al. ............. 707/101 |
| 6,934,687 | B1 | * | 8/2005 | Papierniak et al. .......... 705/10 |
| 7,096,498 | B2 | * | 8/2006 | Judge .......................... 726/22 |

OTHER PUBLICATIONS

Visualization support for user-centered model selection in knowledge discovery in databases Tu Bao Ho; Trong Dung Nguyen; Tools with Artificial Intelligence, Proceedings of the 13th International Conference on Nov. 7-9, 2001 pp. 228-235.*

Configuration detection as a problem of knowledge discovery in computer networks Murayama, Y.; Cooperative Information Systems, 1997. COOPIS '97., Proceedings of the Second IFCIS International Conference on Jun. 24-27, 1997 pp. 47-55.*

Knowledge discovery: comprehensibility of the results Askira-Gelman, I.; System Sciences, 1998., Proceedings of the Thirty-First Hawaii International Conference on vol. 5, Jan. 6-9, 1998 pp. 247-255 vol. 5.*

Provost, Foster J., et al., "Inductive Policy: The Pragmatics of Bias Selection," Machine Learning, 20, Kluwer Academic Publishers, Boston, 1995, pp. 35-61.

Craw, Susan, et al. "CONSULTANT: Providing Advice for the Machine Learning Toolbox," Research and Development in Expert Systems 1X, M. A. Bramer & R. W. Milne (Eds), Cambridge, 1992, pp. 5-23.

Suyama, Akihiro, et al. "CAMLET: A Platform for Automatic Composition of Inductive Applications Using Ontologies," School of Information, Shizuoka University, Abstract.

"A Meta-Learning Assistant for Providing User Support in Machine Learning and Data Mining," Esprit Metal Project (26.357), Dec. 1998-Nov. 2001.

* cited by examiner

SYSTEM, PROCESS AND SOFTWARE ARRANGEMENT FOR ASSISTING WITH A KNOWLEDGE DISCOVERY PROCESS

CROSS-REFERENCE TO A RELATED APPLICATION

This application is a national stage application of PCT Application No. PCT/US02/00545 which was filed on Jan. 4, 2002, and published on Jul. 11, 2002 as International Publication No. WO 02/054272 (the "International Application"). This application claims priority from the International Application pursuant to 35 U.S.C. § 365. The present application also claims priority under 35 U.S.C. § 119 from U.S. Patent Application Ser. No. 60/259,780 filed on Jan. 4, 2001. The entire disclosures of these applications are incorporated herein by reference.

FIELD OF THE INVENTION

The present invention relates to a system, process and software arrangement for assisting with knowledge discovery ("KD") solutions, and more particularly to providing KD solutions, and possibly rankings of these KD solutions using certain criteria.

BACKGROUND INFORMATION

"Knowledge Discovery" ("KD") can be used for a technology-supported analysis of data to produce results useful to a user. In particular, a variety of algorithmic modeling techniques have been produced including machine learning, applied statistics, pattern recognition, and data mining.

Knowledge Discovery may involve the use of certain "learning programs", among others, to discover useful knowledge about a particular domain of inquiry from sets of domain-specific data. For example, many commercial fields may contain data on legitimate and fraudulent transactions. For such data, it is possible for analysts to apply algorithmic modeling techniques ("data mining programs") to the data, and extract the patterns that can be used to identify future fraudulent transactions, e.g., quicker than if the fraud is reported by a customer after receiving his/her bill.

A KD process is one of the central notions of the field of Knowledge Discovery and Data mining. The process generally is considered to comprise several stages, including preprocessing data, the application of an induction algorithm, post-processing of the output, evaluation, etc. In the past, the application of the data mining (e.g., induction) algorithm has been observed to account for 20% or less of the KD effort.

For example, a typical KD process template is shown in FIG. 1, which includes four KD-process stages, e.g., a selections stage, a preprocessing stage of the data, an application of induction algorithms stage, and a post-processing stage of an output. In particular, original data 10 is automatically selected by a selection module 15 (i.e., an operator for a stage), or by a user using an input device (e.g., a mouse, a keyboard, etc.), to generate target data 20. Thereafter, the target data 20 is forwarded to a pre-processing module 25 (i.e., another KD procedure/operator) to produce pre-processed data 30. The pre-processed data 30 is then provided to an induction module 35 (e.g., another KD procedure/operator) which produces certain models and/or patterns 40. All together, the KD procedure/operators form a KD process. These models/patterns are forwarded to a post-processing/interpretation module 45 which generates resultant knowledge data 50. The template shown in FIG. 1 is only exemplary; indeed other possible templates and/or stages could be implemented.

A KD process space can be viewed as including states and operators. The states include data sets and data-mining results, along with various descriptive characteristics. The operators may include various preprocessing algorithms, data-mining algorithms, and post-processing algorithms. An instance of the data mining process may be a series of operators that begins with a data set and ends with a mining result.

FIG. 2 shows three exemplary KD processes which may possibly be utilized for particular numeric data. In a first process 1, first numeric data 60 is provided to a decision-tree inducer 65 which generates a first model 69. In a second process 2, second numeric data 70 is pre-processed using a discretization procedure of numeric attributes 75 to be used in building a naïve Bayesian classifier 77, and thereafter a second model 79 is generated. In a third process 3, third data numeric data 80 is pre-processed by taking a random sub-sample thereof 85, applying a discretization procedure 87 on the numeric data, building a naïve Bayesian classifier 77 and produce a third model 89.

Intelligent Discovery Assistants ("IDAs") are computer systems and processes which assist data mining users to explore the space of the valid KD processes. The space of valid KD processes includes those processes which do not violate fundamental constraints of their constituent techniques. For example, if an input data set includes numeric attributes (as is the case with the first, second and third data 60, 70, 80), the application of a naïve Bayes procedure on such data should not be performed since it is an invalid KD process to be applied therefor. This is because the naive Bayes procedure can only be utilized for categorical attributes, and not for numeric attributes. However, the entire second process 2 of FIG. 2 is considered to be valid because the second numeric data 70 is preprocessed using a discretization procedure 75, thereby transforming the numeric attributes of such data to categorical attributes. The IDAs utilize an explicit ontology of the KD techniques which defines the existing techniques and their properties. With such an ontology, one such IDA can perform a search of the space of valid processes, and consider the techniques to be the operators that change the world state, with preconditions that constrain their applicability.

One of the disadvantages of a number of prior art systems and methods is that they may not significantly assist the data mining user with a selection of an appropriate set of the KD processes. In one particular scenario, when presented with a data set to mine, the KD user may be faced with a confusing array of choices. For example:

should C4.5 technique be used on the data (as opposed to a naïve Bayes procedure or a logistic regression algorithm);

should the discretization be used, and if so, which method;

should the data be sub-sampled;

should the resultant class description be pruned; and should costs of a mis-classification be taken into consideration, etc.?

For a novice user, these choices are overwhelming. Many novice users simply use the algorithm that they are familiar with, with little pre-processing or post-processing. Even KD expert users do not have knowledge of each and every technique applicable to each type of data.

SUMMARY OF THE INVENTION

The system and process according to the present invention preferably interacts with the user to obtain data, goals and desiderata. Then, a set of reasonable KD processes (e.g., plans/solutions) can be composed according to the constraints provided by the user inputs, the data and/or the ontology. In effect, this may involve a selection of induction algorithm(s), and appropriate pre- and post-processing of the data. In this manner, all KD procedures (can also be referred to as operators) available to or composed by the system and process according to the present invention can be considered, without being overlooked (even though the user may not be aware of a particular KD procedure which would work well with the user-selected data). Next, the system and process can rank solutions which have the appropriate sets of operators into a suggested order based on the user's desiderata. The user can then select the solutions from the suggested list. Finally, the system and process of the present invention can generate a computer code which may configure and automatically execute the suggested procedures.

Various embodiments of a process and system according to the present invention overcome the above-described deficiencies of the conventional systems and methods.

In particular, process, system and computer software according to the present invention are provided to produce at least two solutions related to KD from data. In particular, certain information regarding operators which are usable for the knowledge discovery from the data is received. The solutions are then generated, with each solution including at least one of the operators. An ability is facilitated to select at least one solution so as to execute one or more procedures on the data. Whereas each of the procedures is associated with one or more operators of the respective solution. In addition, it is possible to include a variable number of the operators in at least one (and possibly all) of the solutions. Also, a computer code can be generated for at least one automatically-generated solution. In particular, access to the automatically-generated solution can be obtained, with such solution including the operators that are usable for the knowledge discovery of the data. Then, the code is generated for associating one of the operators of the automatically-generated solution with another one of the operators of the automatically-generated solution.

According to another exemplary embodiment of the present invention, the procedures associated with the respective solution operator perform operations for mining the data. Before the information regarding the operators is received, the data can be identified to be subjected to the knowledge discovery. Also, meta data may be extracted from the identified data. In particular, the meta data provide characteristics of the identified data. The characteristics of the data include attributes of the identified data which indicate that the identified data are continuous, categorical and/or incomplete.

In yet another embodiment of the present invention, certain information is received which identifies a type of the solutions to be generated, the desired result of the knowledge discovery and/or the type of data to be provided in the desired result. In addition, as the solutions are generated, the validity of each of the solutions may be verified based on the metadata, the goals, and the ontological information. The generation of the solutions can also include the procedure to collect valid operators for each of the solutions so as to produce a list of solutions. The operators can be provided in an ontology structure of operators. Also, the specifications of the operators provided in the ontology structure can be received to allow the collecting procedure to be performed using the specifications. The operator of each of the solutions may be a knowledge discovery operator or a data mining operator. Each of the solutions may include at least two operators. Also, it is possible to execute the procedures associated with the operators of each selected solution.

The term "data mining operator" can denote an operator whose main goal is the production of knowledge elements (e.g., models, patterns, etc.). The term "knowledge discovery operator" may denote other operators used in the KD process, such as data selection operators, data transformation operators, etc.

In still another embodiment of the present invention, a rank may be produced for each of the solutions based on at least one predetermined criterion which can include the particular information. Before the generation of the solutions, it is possible to receive further information for the predetermined criterion, which may include weights to be provided by a user. Each of the weights can be associated with a particular attribute of a model of the selected solution. Also, prior to the generation of the solutions, a score can be generated for each solution based on the weights, e.g., using a heuristic procedure or can be performed automatically by executing learning procedures. The generation of the solutions can be performed by assembling the solutions in a solution list, and adding to the solution list each solution for which the score was generated. The valid operator can be provided in an ontology structure of operators.

In a further embodiment of the present invention, it is possible to receive specifications of the operators provided in the ontology structure, whereby the ranking procedure can be performed based on the specifications. The ranking procedure may also be performed by supplying an example of the data to each of the solutions, and obtaining the rank for each solution based on an output, accuracy and/or performance of the solutions. Also, the solutions can be assembled based on the rank associated with each of the solutions.

In yet another embodiment of the present invention, the generated code can be an executable code and/or a source code, and code may be generated for a particular solution when it is selected. The generated code can then execute the respective solution associated therewith on the data. Also, prior to the generation of the solutions, a template can be obtained which includes information regarding execution sequences of the operators. The solutions are generated based on the information provided in the template. The information of the template may include restrictions regarding an execution sequence order of each of the operators with respect to one another and/or whether the procedures of a particular solution are to be executed in parallel with the procedures of another object of the particular solution.

The process, system and computer software according to the present invention may provide assistance in educating non-expert users, and allow such users to progress toward becoming expert users. For example, when the system process and computer software produce a highly ranked plan that the user had not previously considered, the user can review a viewable portion of the ontology, and educate himself or herself regarding the previously unknown (e.g., to the user) aspects of the KD process. Another advantage which the process, system and computer software according to the present invention can provide an interaction and information sharing between various users. In particular, if one user knows of a particular operator to be used on certain data, such user would be able to forward this information to the operator ontology. Thereafter, other users, when utilizing the process, system and computer software according to the present invention, can be given the knowledge and access via the operator ontology to the this new operator for, e.g., mining the data, whereas they would otherwise not possess the know-how of this particular operator.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

I. High-Level Diagram of an Exemplary System

Figure 1:
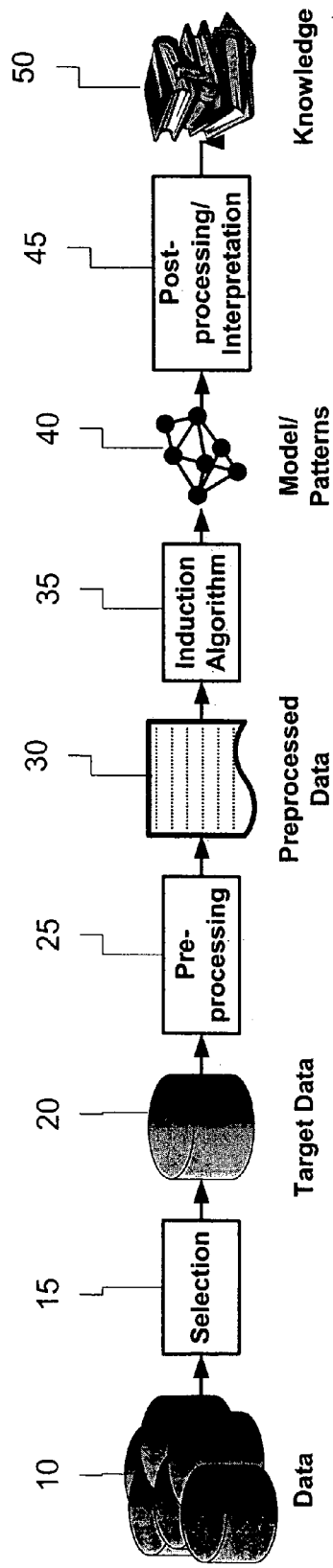
FIG. 1 is a template for an exemplary prior art knowledge discovery ("KD") process that can be used to obtain certain information from data provided thereto.
Figure 2:
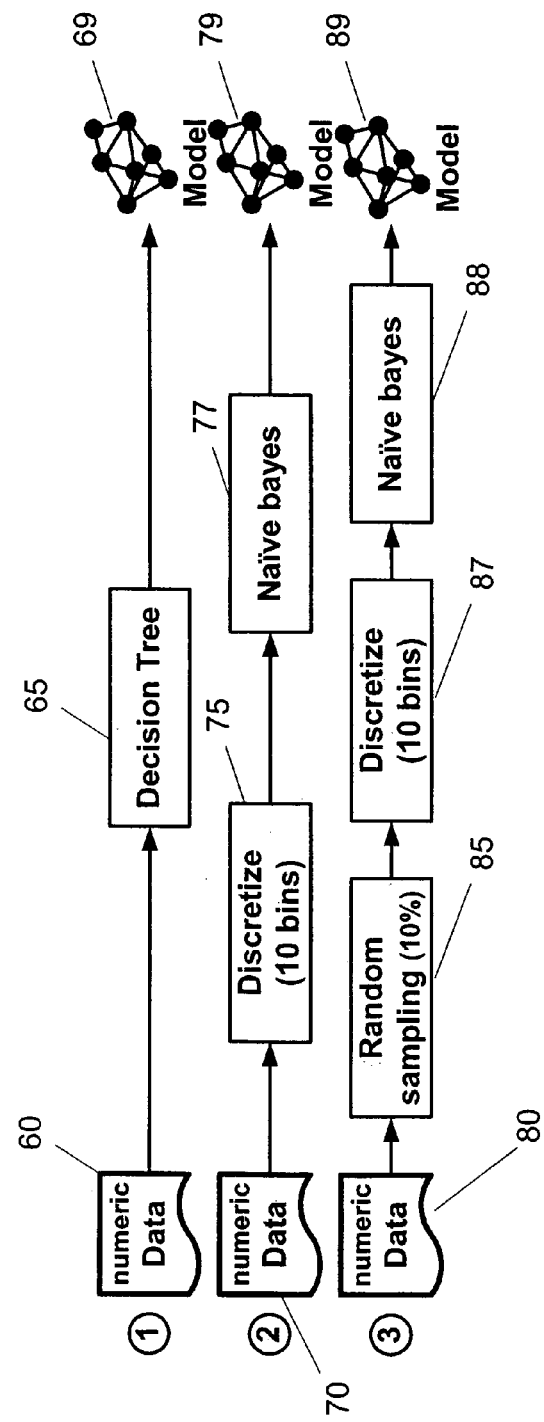
FIG. 2 is an illustration of exemplary KD processes which can be used on numeric data.
Figure 3:
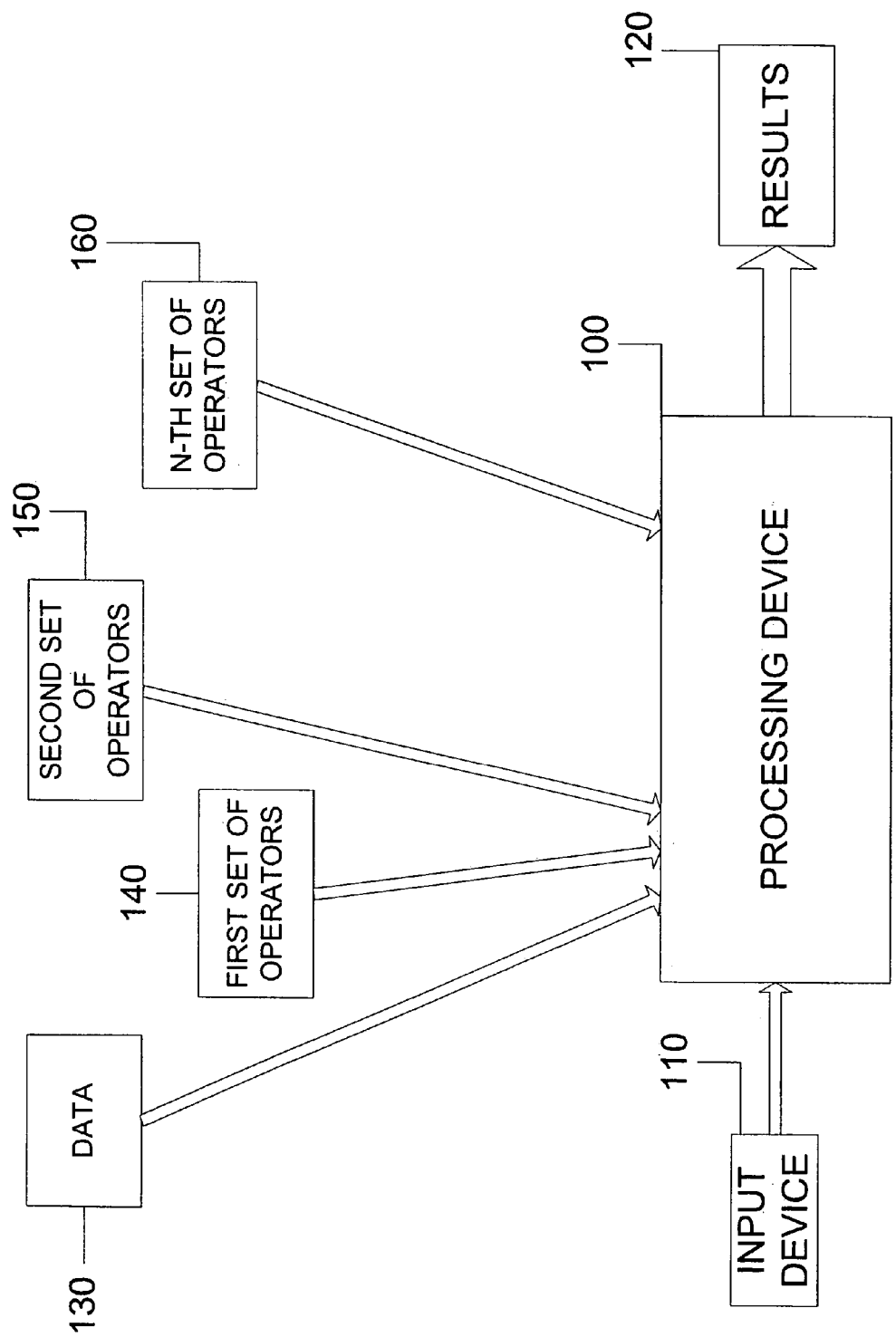
FIG. 3 is a system diagram of an exemplary embodiment of a system according to the present invention for use with knowledge discovery ("KD") processes.

FIG. 3 illustrates an exemplary embodiment of a system according to the present invention which can be used to assist in the knowledge discovery ("KD") process by receiving data and executing the exemplary process of the present invention as shall be described in further detail below. In particular, the system includes a processing device 100 which can be a mini-computer, a micro-computer, a mainframe, etc. This processing device is preferably connected to an input device 110, e.g., a keyboard, mouse, etc. The input device 110 is provided to receive instructions from a user, and forward these instructions to the processing device 100. For example, the user may desire to obtain results in a very quick manner, while not requiring a high accuracy thereof. Thus, the user would input, using the input device 110, his or her instructions for the processing device 100 to provide a list of necessary operations/procedures to execute the task using the constraints entered by the user via the input device 110. The details of the exemplary operations/procedures and instructions shall be described below in further detail.

The processing device 100 can access data 130 from an internal data source (e.g., a CD-ROM, hard drive, etc.) or an external data source (a database, a collection of databases, etc.), either directly or via a communication arrangement (e.g., the Internet, intranet, extranet, etc.). The data 130 can be categorical, numerical, a combination of both, relational, time-series, etc. One of the benefits of the present invention is the ability of the processing device 100 and process executed thereby to mine various types of data, irrespective of the differences and characteristics thereof. Thus, when the processing device 100 obtains access to the data 130, it can then perform the tasks associated with the operations/procedures that it has access to on such data 130.

The processing device 100 has access to these operations/procedures (referred to herein below as "operators"). In particular, the processing device 100 can obtain a first set of operators 140, a second set of operators 150, ... and an n-th set of operators 160. These operators 140, 150, 160 can reside in a memory of the processing device 100, stored on a hard drive thereof and/or stored on a storage device which is external from the processing device 100. The operators 140, 150, 160 can be provided to the processing device 100 from separate sources, or may be forwarded from a single source. In a preferable embodiment of the present invention, the operators 140, 150, 160 form at least a portion of an explicit ontology of the KD techniques to be used by the system and process of the present invention as shall be described below.

The processing device 100 also has access to a software program or another logic arrangement which, when executed by the processing device 100, causes it to compile a list of solutions (each of which includes at least one operator obtained from the first, second and/or third set of the operators 140, 150, 160), rank each solution in accordance with the instructions provided by the user via the input device 110, and output the results of such execution 120, e.g., as a list of the ranked solutions. The results 120 can be displayed on an output device, such as a monitor, printer, etc.

Thereafter, the software program described above, via the processing device 100 and the input device 110, allows the user to select one or more of the provided solutions, and execute the procedures associated with the operators on the data 130. Prior to such execution, the processing device 100 is controlled by the software program to generate the computer code which is provided to execute the procedures associated with the operators 140, 150, 160 for the selected solution. According to the preferred embodiment of the present invention, the computer code for the operators/procedures themselves is preferably provided to the system and process of the present invention, and the code for executing the operators/procedures and passing intermediate results there between is preferably generated by the invention. Further details of the above-described operation of the processing device 100 shall be described in further detail below.

II. Intelligent Discovery Electronic Assistant

Figure 4A:
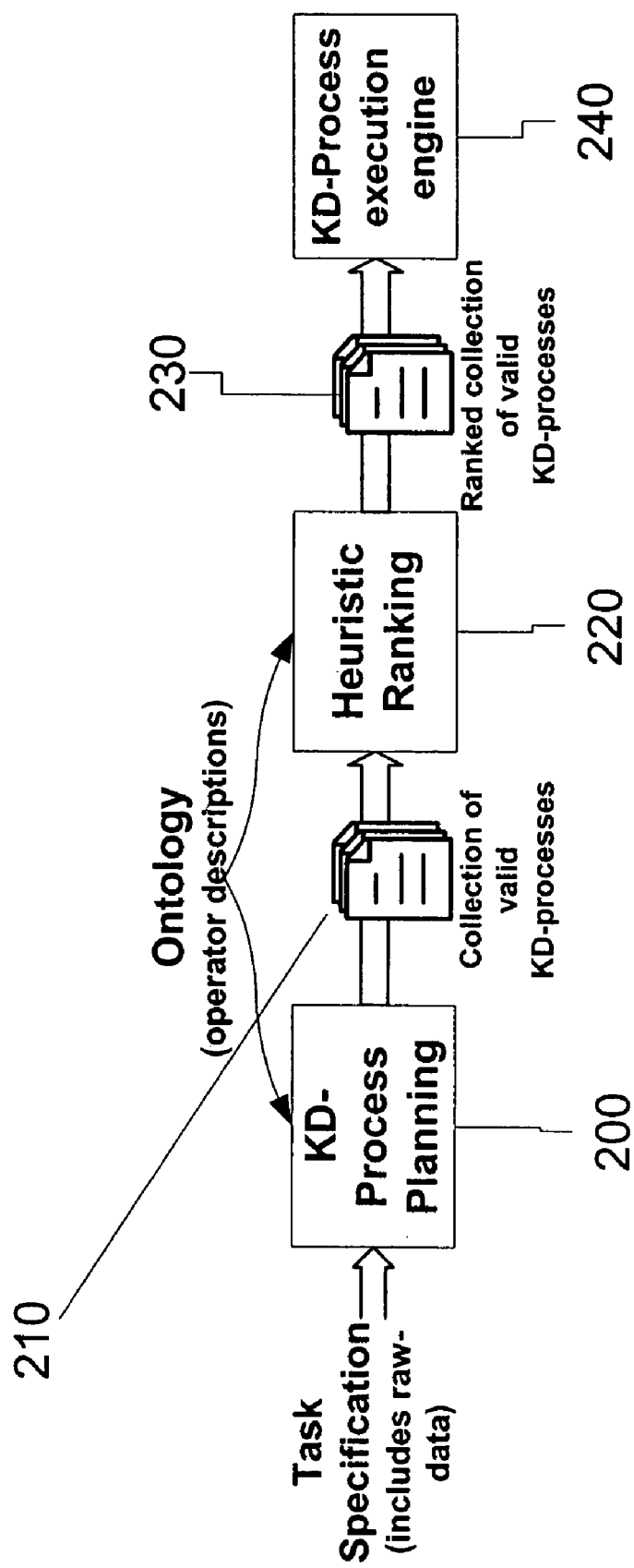
FIG. 4A is a flow diagram of an exemplary embodiment of a process for assisting with the KD processes according to the present invention which can be implemented using the system of FIG. 3.
Figure 4B:
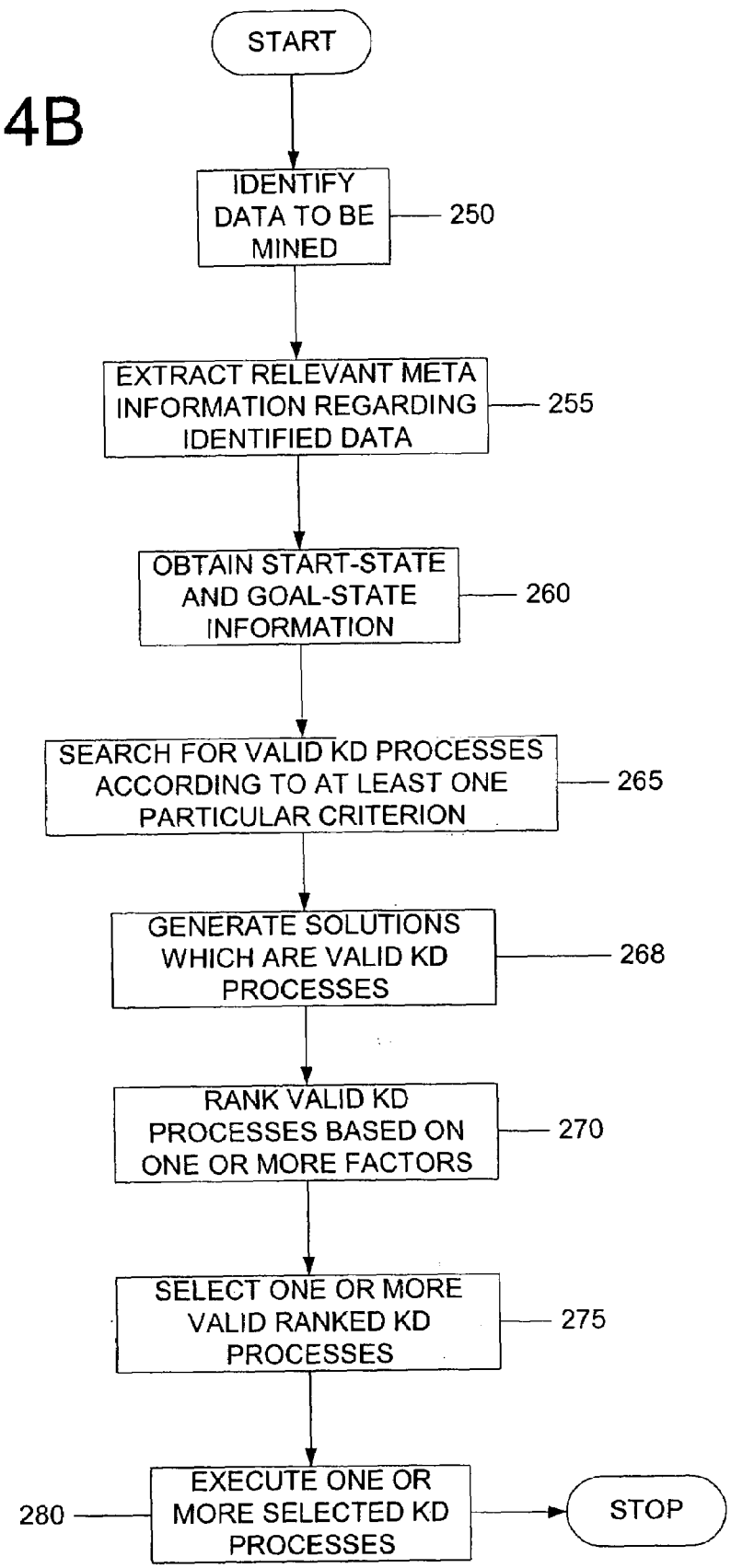
FIG. 4B is a detailed flow diagram of the process illustrated in FIG. 4A.

FIG. 4A shows a flow diagram of an exemplary embodiment of a process for assisting with plan generation and implementation of the KD processes according to the present invention. FIG. 4B shows a detailed illustration of the process illustrated in FIG. 4A. Turning first to FIG. 4A, this exemplary process can be implemented using the software, firmware and/or hardware arrangement which configures the processing device 100 to execute the plan generation/ranking process described above. The software, firmware and/or hardware arrangement implementing the process shown in FIG. 4A shall be referred to herein below as an Intelligent Knowledge Discovery Electronic Assistant ("IDEA"). As shown in FIG. 4A, the IDEA configures the processing device 100 to first receive a task specification from the user via the input device 110, which is forwarded to a KD-process planning module 200. In addition, the data 130 is also made available to this planning module 200. The KD-process planning module 200 of FIG. 4A analyzes the data associated with the task specification (e.g., information regarding the data that the user wishes to mine) in step 250 of FIG. 4B.

Furthermore, using the planning module 200 of FIG. 4A, the relevant meta-information about the data, such as the types of attributes included therein (e.g., the data being continuous, categorical, etc.) is extracted in step 255 of FIG. 4B. Thereafter, the processing device 100 requests the user to provide the additional start-state information and goal-state information in step 260 of FIG. 4B. The goal-state information can preferably be the type of information/model the user wishes to extract, as well as other desiderata (e.g., speed, accuracy, cost-sensitivity, comprehensibility, etc.). As shown in FIG. 4B, the IDEA then can search for the KD procedures/operators (e.g., the processes resulting in the desired type of a model from the provided data) within the overall design-space of possible KD procedures/operators defined by the ontology (step 265), the search which is performed by a first component of the IDEA—a KD process planner. In this step, the IDEA can determine which of the KD procedures/operators are capable of cooperating with one another using a database, for example, which includes the information regarding various associations of the KD procedures/operators. Also, one or more solutions, each composed of one or more KD procedures/operators, can be formed to comply with the goal-state information (step 268). Steps 255–268 are preferably performed using the processing-planning module 200 of FIG. 4A. The output of the process-planning module 200 is a set or collection of KD procedures/operators (block 210 of FIG. 4A). Depending on the task specifications, this set/collection of KD procedures/operators may be empty or include one or more of the KD procedures/operators. The collection of the KD procedures/operators may, however, contain a series of procedures/operators that may be undesirable for a particular purpose. Such undesirable procedures/operators can make trade-offs that are disadvantageous, e.g., sacrificing accuracy to obtain the model in an accelerated manner.

In order to assist the user with locating the KD procedures/operators most suited to the user-supplied goal-state information, the IDEA executes its second component (i.e., a heuristic ranking engine) to rank the collection (i.e., the solutions) of the valid KD processes 210 in a heuristic ranking block 220 of FIG. 4A. More particularly, this ranking procedure may use a heuristic function to rank the solutions based on, e.g., information regarding the attributes of the KD procedures/operators in the respective solutions (processes) from the ontology, the user-supplied goal-state information as defined by weights and the input by the user, etc. (step 270 of FIG. 4B). The output of the heuristic ranking block 220 is a ranked collection of the valid KD processes 230. Thereafter, in step 275 of FIG. 4B, the user can select any number of the solutions from within the ranked list. In step, 280, the KD process(es) of the selected solution(s) can then be executed using, e.g., a library of the KD operator(s) or algorithm(s).

III. Partial Data-Mining Ontology

Provided herein is a description of an exemplary ontology describing the relevant KD procedures/operators which can preferably be used by the system and process of the present invention. It should be noted that the KD process can also be referred to herein as a solution. According to a preferred embodiment of the present invention, the ontology can be viewed as a separate entity. However, it should be understood that the ontology could be hard-coded, and while it may not properly be described as an ontology, such hard-coded operators would serve the same function.

Using such ontology, the users have the flexibility of automatically extending the capabilities of the system and process of the present invention, e.g., by updating the existing ontology. In particular, the ontology may contain the information regarding the currently-existing operators, the relationships between the existing operators, the state of the world, etc. The exemplary embodiment of the IDEA described herein uses the ontology to assist the users in composing and utilizing the valid KD processes. It is preferable that for each operator, the ontology may contain human-readable information about each of the operators (e.g., a full text description);

exact description of the conditions under which the operator can be applied (e.g., a pre-condition as it applies to the state of the KD process, the compatibility of the operators of the present KD process with the preceding operators, etc.);

specification of the operator's effects on the state of the KD-process and its data; and estimation functions/data concerning the run-time attributes of the operator (e.g., speed, accuracy, operator's influence on model comprehensibility, etc.).

Figures 5, 6:
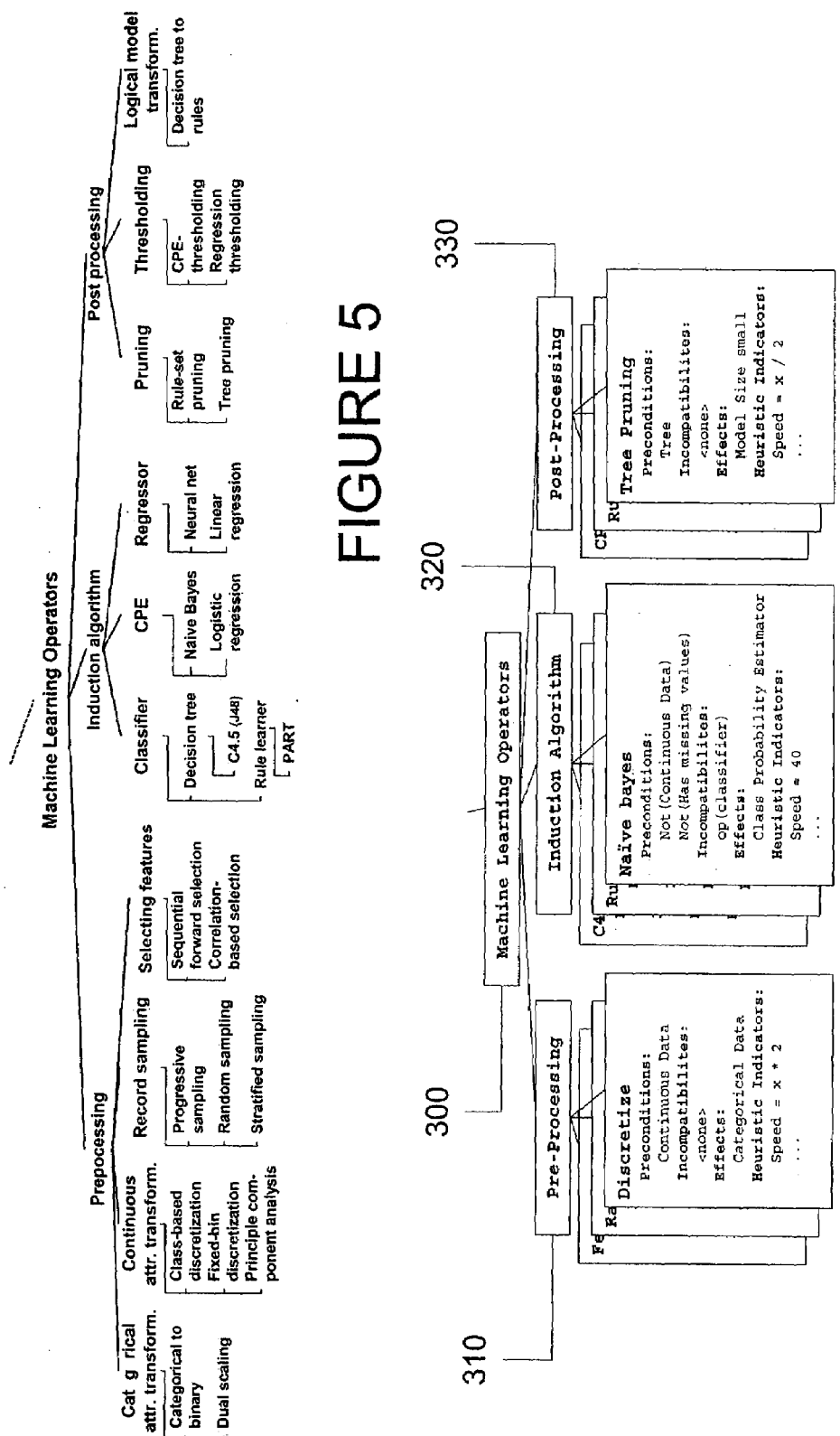
FIG. 5 is an exemplary overall structure of an ontology which groups KD operators into a number of groups, and which can be used with the system of FIG. 3 and the process of FIGS. 4A and 4B according to the present invention.
FIG. 6 is a detailed illustration of exemplary ontology entries of the ontology shown in FIG. 5.

In addition, the ontology preferably groups the KD procedures/operators into logical groups, which can be used to narrow the set of procedures/operators to be considered at each stage in the KD process. FIG. 5 shows a exemplary overall tree-type structure of an ontology which groups the KD procedures/operators into three groups, and which can be used with the system of FIG. 3 and the process of FIGS. 4A and 4B according to the present invention. These three groups are, e.g., a pre-processing group, an induction algorithm group, and a post-processing group. As illustrated in FIG. 5, each of these groups is further subdivided. In particular, the leafs of the tree-type structure of the ontology according to an exemplary embodiment of the present invention are preferably the procedures/operators. For example, the induction algorithm group can be subdivided into classifiers, class probability estimators ("CPEs") and regressors. The classifiers can further be grouped into decision trees (e.g., a C4.5 algorithm as described in J. R. Quinlan, "C4.5: Programs for Machine Learning", San Mateo, Calif., Morgan Kaufmann, 1993) and rule learners (e.g., a "PART" algorithm as described in E. Frank et al., "Generating Accurate Rule Sets Without Global Optimization", In Proceedings of the Fifteenth International Conference on Machine Learning, 1998, pp. 144–151).

A partial view of the details of the exemplary ontology entries of the ontology shown in FIG. 5 is illustrated in FIG. 6. As described above and shown in FIG. 6, the KD procedures/operators can be defined as machine learning operators 300 which are grouped into a pre-processing group 310, an induction algorithm group 320 and a post-processing group 330. Similarly to the leafs in FIG. 5, the leafs in FIG. 6 are also actual procedures/operators. For the sake of clarity, most of the exemplary operators are not illustrated in FIG. 6, except for the example of the "discretize" node leafs of the pre-processing group 310, the "Naive Bayes" node leafs of the induction algorithm group 320 and the "Tree Pruning" node leafs of the post-processing group 330. It should be understood that the illu provided only for the purpose of illustration, and should not be viewed as being complete. In addition, it is also within the scope of the present invention to extend and/or change the ontology with new procedures/operators and sub-groups so as to create alternative scenarios. This is because the ontology-driven approach provides the flexibility to change, add and/or remove any node, leaf or group with respect to the ontology.

IV. Kd Process Planner

The KD process planner of the IDEA according to the exemplary embodiment of the present invention generates a set of solutions containing one or more of the KD procedures/operators. The determination regarding the validity of the KD processes/solutions is generally based on one or more criteria, e.g., the data meta-model, the start-state information, the specification of the desired induction model and/or the goal-state information, etc. The KD procedures/operators for a particular solution are selected from all available KD procedures/operators as defined by the ontology.

Figure 7:
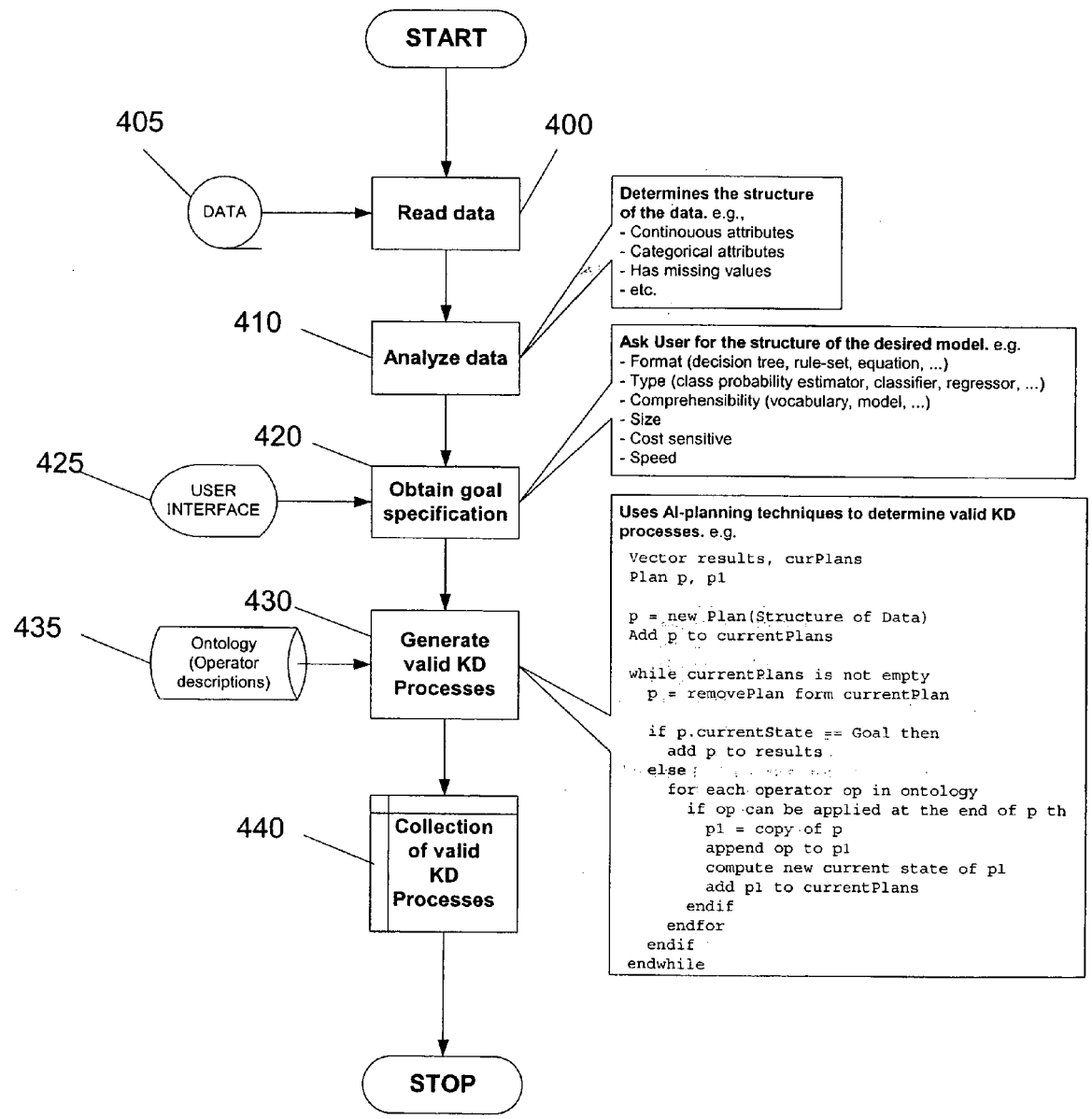
FIG. 7 is a flow diagram of an exemplary embodiment of a planning procedure for the KD process according to the present invention.

As shown in FIG. 7, the exemplary embodiment of the KD process planner according to the present invention is implemented using, e.g., a constrained enumeration search technique. In particular, the ontology may define the processes/operators and the constraints. First, the processing device 100 is provided with the data 405 to be explored in step 400. Thereafter, the processing device 100 may obtain the start-state information from the user and/or can extract, and then analyze the information from the data meta-model (step 410). The analysis in step 410 can be performed by, e.g., determining the structure of the data—whether it has continuous attributes, categorical attributes, missing values, etc. It should be noted that different data formats generally provide varying data meta-models. Thus, it is possible to have numerous alternative start-state extractors. For example, the ".arff" data format begins with meta information which defines the types of attributes present and possible values for the categorical attributes, as described in I. Witten et al., "Data Mining: Practical Machine Learning Tools and Techniques with Java Implementation", Morgan Kaufman Publishers, 2000.

In step 420, the goal-state information (e.g., the goal criteria) can be obtained, e.g., from the user via user interface 425 by using graphical user interface dialog boxes. It is also possible for the processing device 100 to utilize default goal-state information which can be inferred from the meta data. A variety of the goal-state information can be obtained which may be, e.g., a high accuracy, fast mining, fast model execution, comprehensible output, cost-sensitive operation, few features used,. etc. It should be understood that these criteria may at times be contradictory to one another. In such situations, the processing device 100 may provide to the user a method for specifying the desired tradeoffs. For example, if accuracy and speed of learning are incompatible for particular data, the processing device 100 may display to the user a slide bar or a weighting scheme for specifying which is more important to the user, and to what extent. In one exemplary embodiment, the user may be requested to provide the structure of the desired model, e.g., format (decision tree, rule-set, equation, etc.), type (class probability estimator, classifier, regressor, etc.), comprehensibility (vocabulary, model, etc.), size, cost sensitivity, speed, and/or others.

Thereafter, in step 430, the KD process planner according to the present invention can generate the solutions/plans (processes) which include KD procedure(s)/operator(s). This is preferably performed using the descriptions/specifications of capabilities of the operators 435 of the ontology so as to avoid the combinatorial explosion of the valid KD processes/solutions/plans. For example, certain algorithms can be used for performing an efficient search of large spaces. The result of such generation is the collection of valid KD processes/solutions/plans in step 440. An exemplary planning technique to determine the valid KD process/solution/plan can be generated as follows:

```
Vector results, curPlans
Plan p, p1
p = new Plan(Structure of Data)
Add p to currentPlans
while currentPlans is not empty
    p = removePlan form currentPlan
    if p.currentState == Goal then
        add p to results
    else
        for each operator op in ontology
            if op can be applied at the end of p
            then
                p1 = copy of p
                append op to p1
                compute new current state of p1
                add p1 to currentPlans
            endif
        endfor
    endif
endwhile
```

It should be understood that other artificial intelligence and/or search techniques can be performed in the KD process planner, and are within the scope of the present invention.

V. Heuristic Ranking

Figure 8:
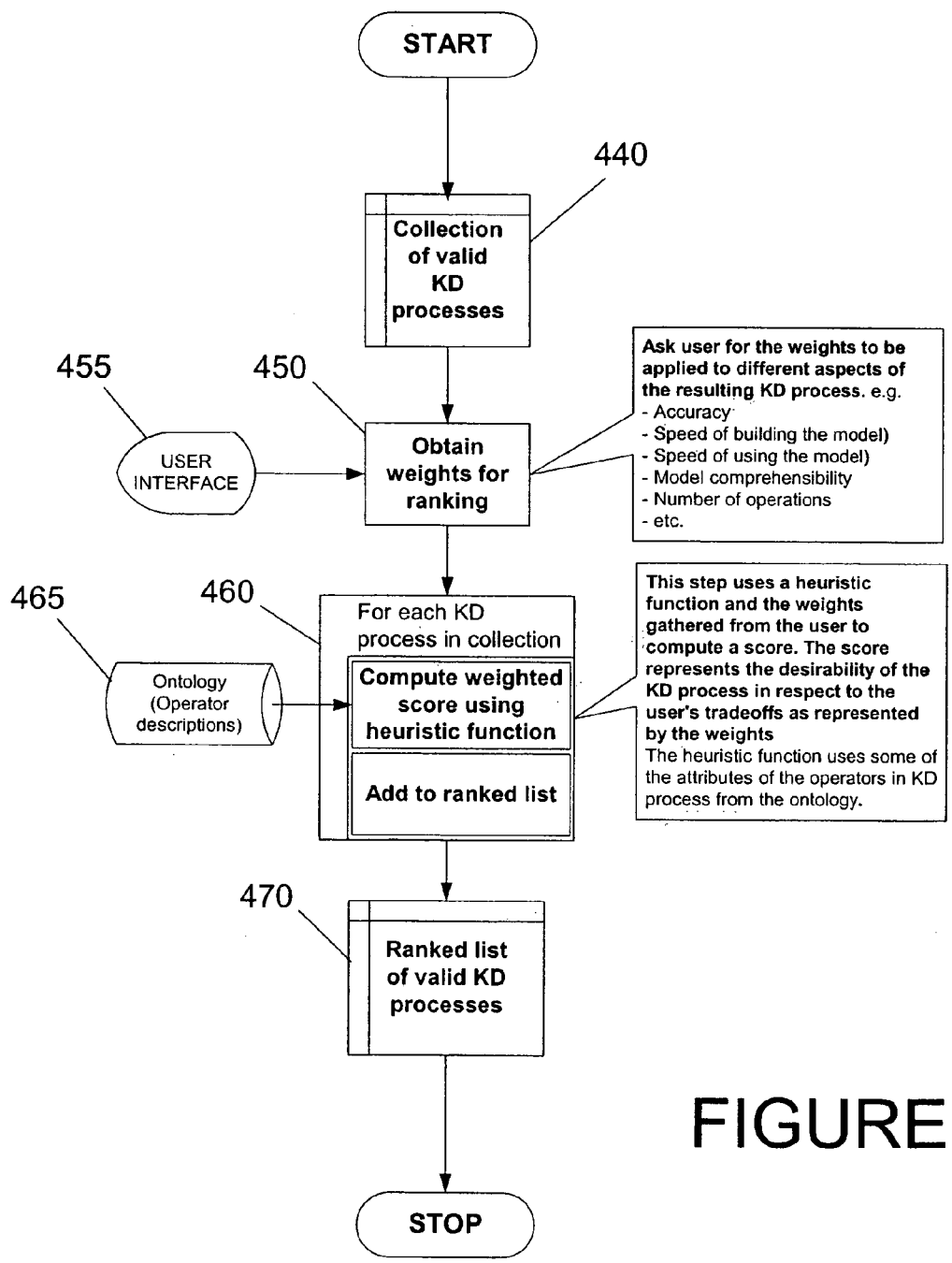
FIG. 8 is a flow diagram of an exemplary embodiment of a heuristic planning procedure according to the present invention which may rank the solutions among valid KD processes.

With a potentially large number of valid KD processes/solutions/plans for any given data, the exemplary embodiment of the IDEA according to the present invention can assist the user in selecting the most likely candidates among the valid KD processes/plans/solutions generated by the KD process planner described above. FIG. 8 shows a flow diagram of an exemplary embodiment of a heuristic ranking procedure according to the present invention which ranks the valid KD processes/plans/solutions. This heuristic ranking procedure ranks the plans/solutions based on certain tradeoffs between the relevant evaluation criteria of the resulting KD processes. Such relevant evaluation criteria can be the accuracy of the model, the speed of generating the model, the model's comprehensibility (e.g., its structure and/or the vocabulary utilized thereby), the number of operations within the KD process plan/solution, etc.

As shown in FIG. 8 for the exemplary embodiment, which is a ranking portion of the process according to the present invention, the processing device 100 has access to the collection of valid KD processes/plans/solutions 440. Then, the user can be prompted via a user interface 455 to obtain certain evaluation criteria (or weights) for the ranking, e.g., accuracy, speed of generating the model, speed of using the model, model comprehensibility, number of operations, etc. Then, for each valid KD process/plan/solution, the processing device 100 computes the weighted score using, e.g., a heuristic function, and uses the score to add the corresponding KD process/plan/solution to the ranked list of valid KD processes/solutions/plans (step 460). The heuristic planning portion produces the collection of the valid KD processes which are input to the ranking portion. It should be noted that the procedure of step 460 can be performed using the descriptions/specifications of capabilities of the operators 465 of the ontology. In particular, this procedure uses a heuristic function and the weights gathered from the user to compute a score of each valid KD solution/plan (e.g., a numerical score). The score represents the desirability of the particular KD process plan/solution with respect with the user's tradeoffs.

Many (if not all) operators in the ontology have a function associated with each of the above-described evaluation criteria to estimate how the particular operator contributes to the KD process in regard to such criteria. In one exemplary embodiment of the present invention, it is possible to record fixed values for each of the criteria. In order to calculate any of the criteria for the process of the present invention, it is possible for the heuristic ranking procedure to add or multiply the values of all operators associated with such particular criterion.

In another exemplary embodiment of the present invention, the heuristic ranking procedure of the IDEA may record functions on the state within the KD process for each of the KD procedures/operators in the ontology, and calculate a particular value for the contribution of such procedure/operator with respect to any criterion. It is also possible and within the scope of the present invention for the heuristic ranking procedure to evaluate entire plans, and assess interactions between modules and their effects on the goal criteria.

In yet another embodiment of the present invention, the ranking of the valid KD processes/plans/solutions can be obtained as follows. First, example data can be applied to each of the valid KD processes/plans/solutions. The result of such application of test data allows the processing device 100 and the IDEA to generate a score based on the execution time of such plan/solution. Then, the ranking of the valid KD processes/plans/solutions is performed based on the results of the timing of the execution of each such plan/solution. Generally, the quicker the execution of the plan/solution, the higher the ranking score. Of course, it is possible to rank the valid KD processes/plans/solutions based on the slowest-first execution plan/solution.

In still another exemplary embodiment of the present invention, each of the valid KD processes/plans/solutions is executed on the test data to provide the score based on accuracy of the results provided by each respective plan/solution. The accuracy can be determined by comparing the results of each determination (using the associated plan/solution) to the real results (which were previously calculated). In this manner, the processing device 100 and the IDEA can rank the valid KD processes/plans/solutions based on the accuracy of the results of each. Criteria other than the accuracy and speed can also be used, and are within the scope of the present invention.

Further, the system and process according to yet another exemplary embodiment of the present invention can execute the IDEA with the real data as input, and then perform statistical experiments thereon (e.g., using known statistical procedures). The results of these experiments (e.g., statistics of the data processing and output thereof) may then be used to rank the plans/solutions, e.g., sub-sampling or cross-validation could be used to estimate speed or accuracy.

VI. Code Generation and Execution

According to the exemplary embodiment of the present invention, the processing device 100 and the IDEA generate computer code (e.g., Java code) for each valid KD process/plan/solution using, e.g., a data mining toolkit. This code can be produced by examining the valid KD processes/plans/solutions, and determining what series/composition of toolkit methods correspond to such plans/solutions. It should be understood that the code generation procedure is likely to be different for various toolkits. However, according to the present invention, the code generation procedure is not likely to change across various data sets for the sake of reusability.

In another exemplary embodiment of the present invention, the processing device 100 and the IDEA can execute either one, all and/or selected valid KD processes/plans/solutions for the user. Certain existing software packages and toolkits can be used to perform such execution (e.g., Weka, MLC++, etc.). Conventional toolkits include evaluation procedures for certain goals such as the accuracy estimation. Thus, the exemplary embodiment of the processing device 100 and the IDEA of the present invention can utilize these procedures to assess their generated rankings. Other evaluation procedures, such as the timing evaluation, may also be utilized.

VII. Template Defining A Structure Of The Process

In yet another exemplary embodiment of the present invention, it is preferable to add a template procedure to the ontology of the exemplary embodiment of the IDEA for a particular application (e.g., target marketing) which defines a structure on the IDEA. Various types of models can be used, e.g., for the class-probability estimation and the regression model. The template would impose limitations on the IDEA as to which classes of operators are to be executed at particular points of the execution of the knowledge discovery process. It is possible to utilize a default template which has predetermined restrictions that should be imposed on the IDEA. In addition, the template can provide an ability to execute two or more of the KD processes (or a set of processes) simultaneously.

Figure 9:
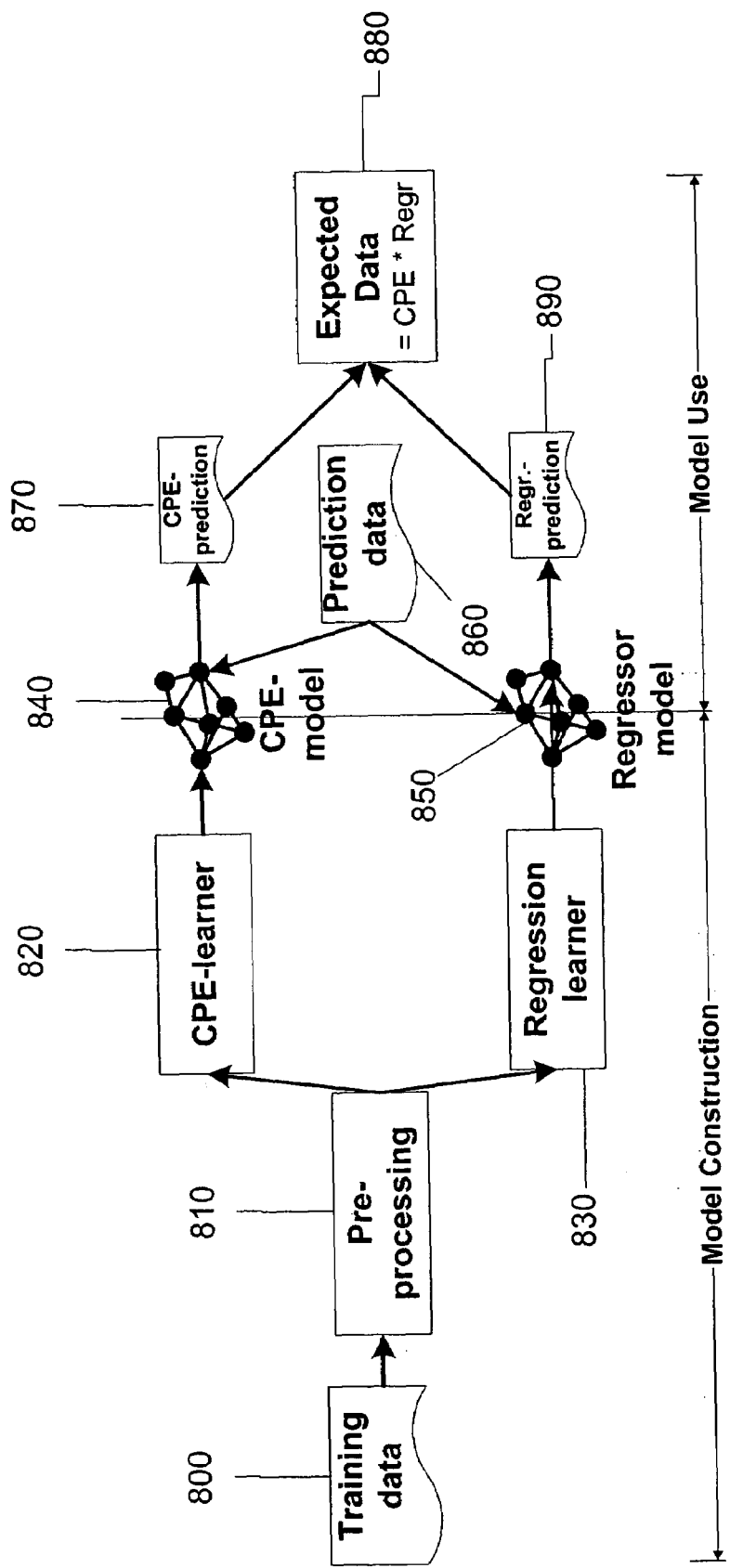
FIG. 9 is a functional diagram of an exemplary embodiment of a template which uses a class probability estimator in parallel with a regression learner according to the present invention, and which can be used with the system of FIG. 3 and the process of FIG. 4.

FIG. 9 shows a functional diagram of an exemplary embodiment of the implementation of the template with a class probability estimator ("CPE") and a regression procedure performed preferably simultaneously according to the present invention which can be used with the processing device 100 of FIG. 3 and the process of FIG. 4. In this example, training data 800 can be supplied to the preprocessing procedure 810. After the training data is preprocessed, it is forwarded to the CPE-learning procedure 820, which generates a CPE model so as to estimate the probability of class membership. Simultaneously, a regression model 850 can be generated from the members of the class present in the training data using a regression learning procedure 830 to estimate a value conditioned on a class membership. The CPE and regression models 840, 850 should preferably be used in combination so that the product thereof estimates the expected value (the probability of class membership times estimated value conditioned on the class membership) for each data point. This can be done by applying the CPE and regression models 840, 850 to the prediction data 860 to produce a CPE prediction 870 and a regression prediction 890. Then, the CPE and regression predictions 870, 890 can be multiplied by one another to generate the expected value.

VIII. Exemplary Implementations

FIGS. 10–16 illustrate an exemplary implementation of the exemplary embodiment of the IDEA according to the present invention, an embodiment of which is shown in FIG. 4, and which can be executed using the processing device 100 shown in FIG. 3. For example, assuming that the knowledge discovery task of a particular user is to generate a model predicting whether a person's income exceeds a particular salary based on census data (e.g., demographics, etc.). For the sake of clarity, the actual mining details of such data shall not be discussed in detail below. However, the following details of the processing procedure by the exemplary embodiment of the IDEA described above shall be discussed in further detail, i.e., the generation of a list of the valid KD processes/plans/solutions (each of which being applicable to mine the data), and the ranking of these plans/solutions differently for the user's various desired criteria.

Figure 10:
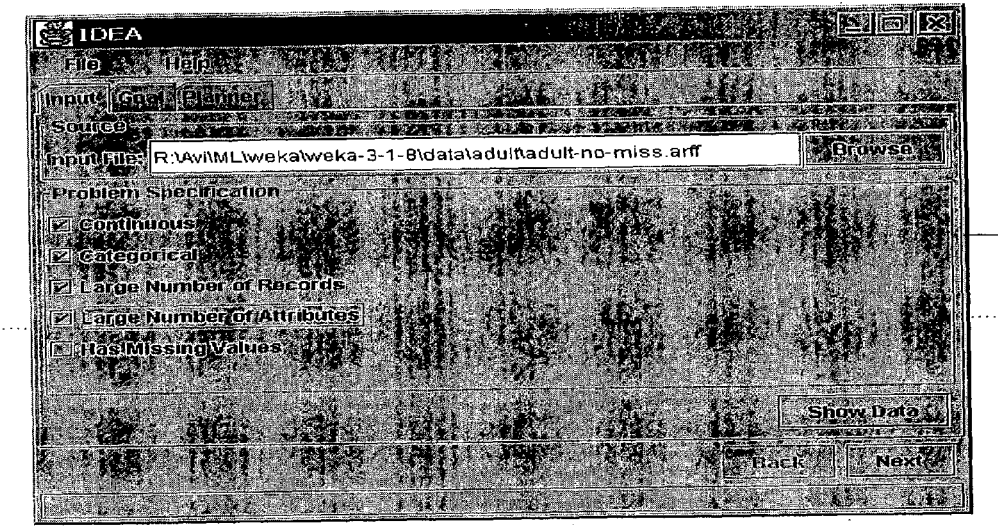
FIG. 10 is a display of an exemplary input interface for the system of the present invention shown in FIG. 3.

In particular, FIG. 10 shows an input interface 500 which may be made available by the exemplary embodiment of the IDEA to the user. Upon accessing this input interface 500, the user can specify the file in which the particular data resides to be analyzed, and may provide a description of the data that will be used to form the start-state information for the KD process planner (described above). In the present implementation, the user indicates that the adult data set contains continuous attributes, contains categorical attributes, has a large number of records, and includes a large number of attributes, but does not have missing values.

Figure 11:
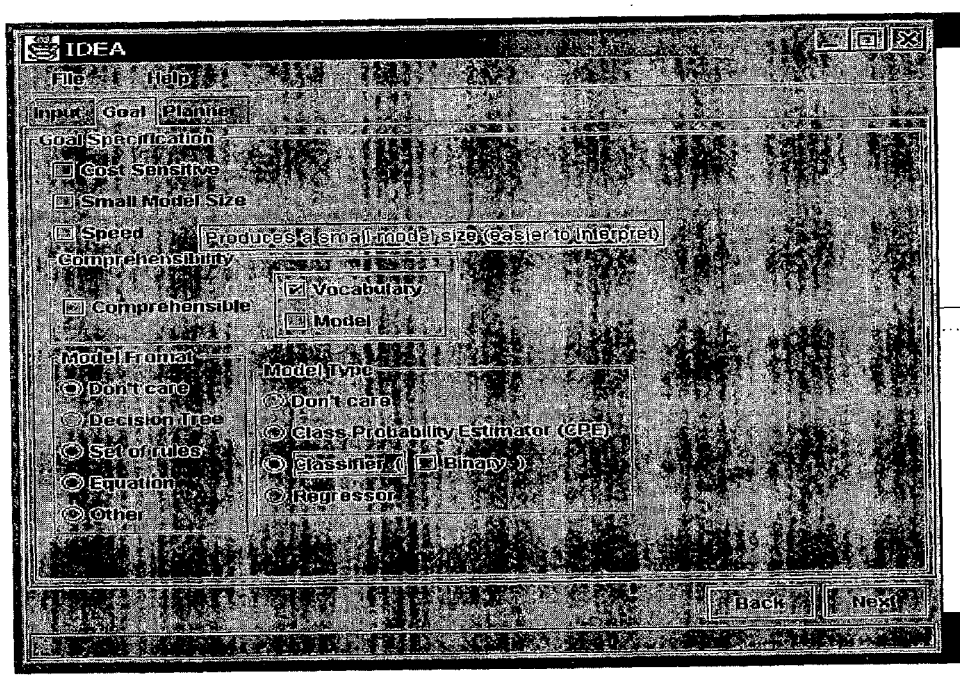
FIG. 11 is a display of an exemplary goal interface for the system of the present invention shown in FIG. 3 which defines a goal of the current session.

Thereafter, upon the depression of the "Next" button on the input interface 500, the user is directed to a goal interface 550 as shown in FIG. 11 to define the goal of the current session. In the goal interface 550, the user may specify requirements on the process. In the present example, the user does not impose many restrictions, and only requires that the model produced be a classifier. Due to the lack of the restrictiveness imposed by the user, the KD process planner is capable of generating a large set of plans (the size of which would depend on the size of the ontology). The user may specify that the KD process is cost-sensitive, may require it to be fast, and/or that it may be required to produce a small or a comprehensible model. The user also can specify certain model formats (e.g., rule sets) that are desired. In this manner, the user completes the goal-state information.

Figure 12:
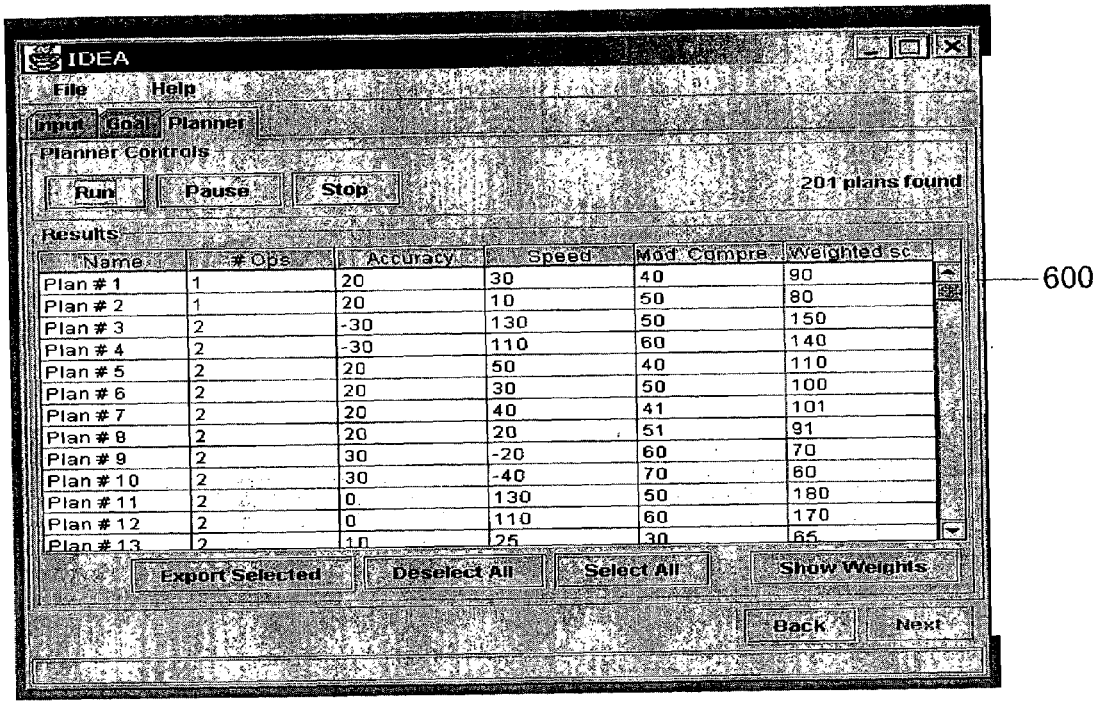
FIG. 12 is a display of an exemplary display and execution interface for the system of the present invention shown in FIG. 3 which displays a list of available ranked plans/solutions and allows the user to select and execute at least one solution.

Upon the depression of the "Next" button on the goal interface 550, the user is directed to a planner interface 600 as shown in FIG. 12 for executing the KD process planner.

Figure 13:
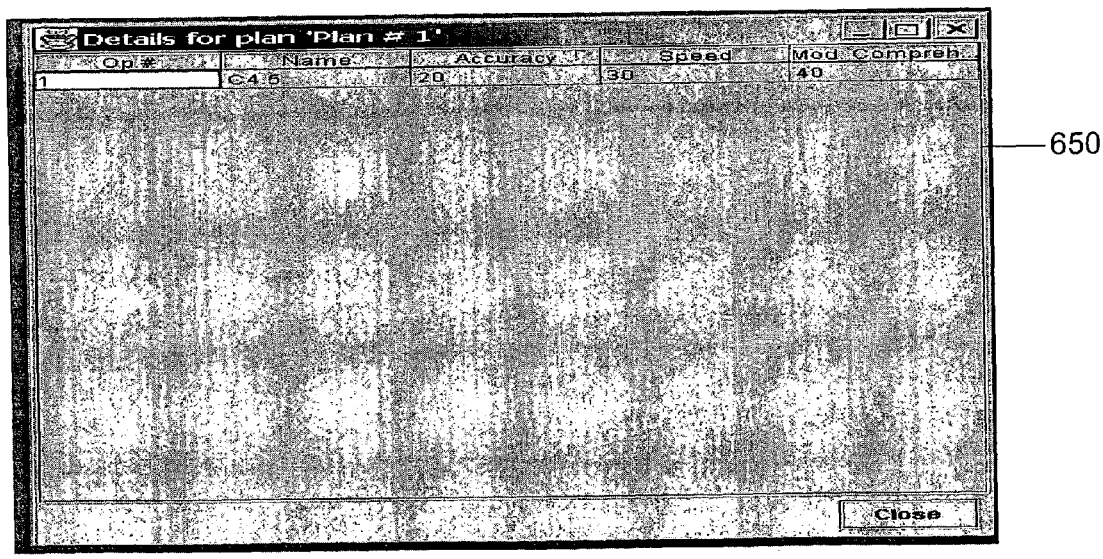
FIG. 13 is a display of the details of an exemplary plan which was selected from the list shown in FIG. 12.

In this example, the user may depress the "Run" button, and the KD process planner generates and/or enumerates, e.g., 201 knowledge discovery process plans/solutions that satisfy the user's requirements. The user can sort the plans by any of the different ranking criteria (e.g., by clicking on the column header of # of Operations, Accuracy, Speed, etc.). The user may click on one or more of the generated plans/solution in the list to see the details thereof 650 as shown in FIG. 13. In this example, plan #1 is a simple solution/plan, and has only one operator, i.e., apply the induction algorithm C4.5.

Figure 14:
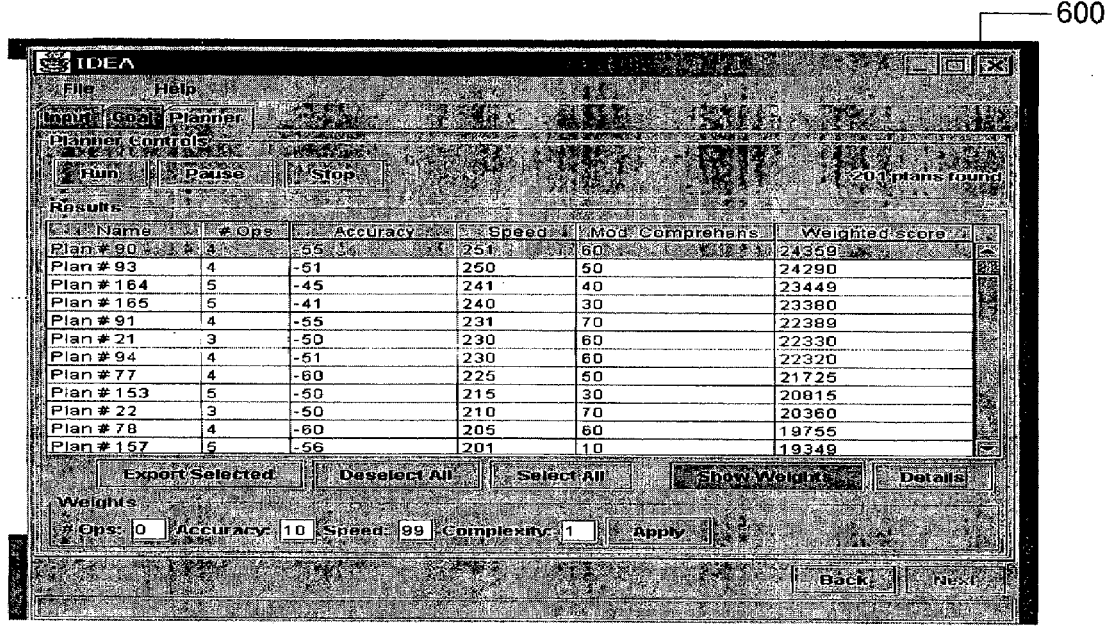
FIG. 14 is a display of another exemplary display and execution interface similar to the display of FIG. 12, in which the user changed a ranking criterion to generate a list of other ranked plans/solutions available for execution.

In FIG. 14, the user returned to the plan list 600, and decided to change the ranking criteria. In this example, the user does not appear to be interested in the number of operators in the plans/solutions. In particular, the accuracy is changed to be moderately important, and the speed as being very important. After applying these operators, the IDEA resorts the list using a new weighted score obtained using the newly inputted operators. As can be seen from the individual plan/solution entries in FIG. 14, the plans/solutions are being provided in a different order and rank, and thus the exemplary embodiment of the IDEA traded off the accuracy for a better expected speed, with plan #90 being at the top of the list of the plans/solutions (i.e., being ranked the highest).

Figure 15:
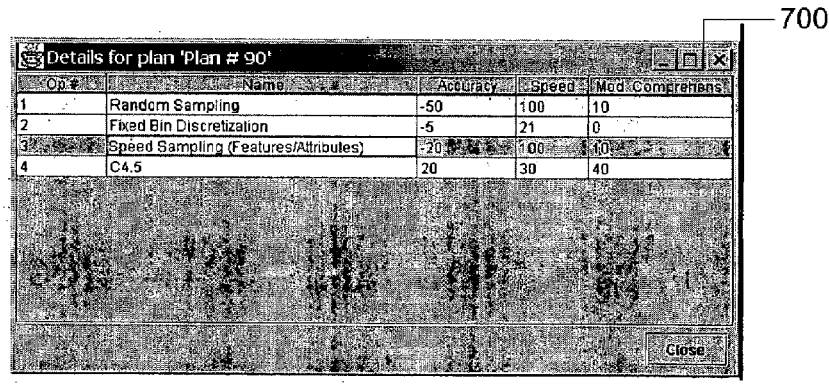
FIG. 15 is a display of the details of an exemplary plan which was selected from the list shown in FIG. 14.
Figure 16:
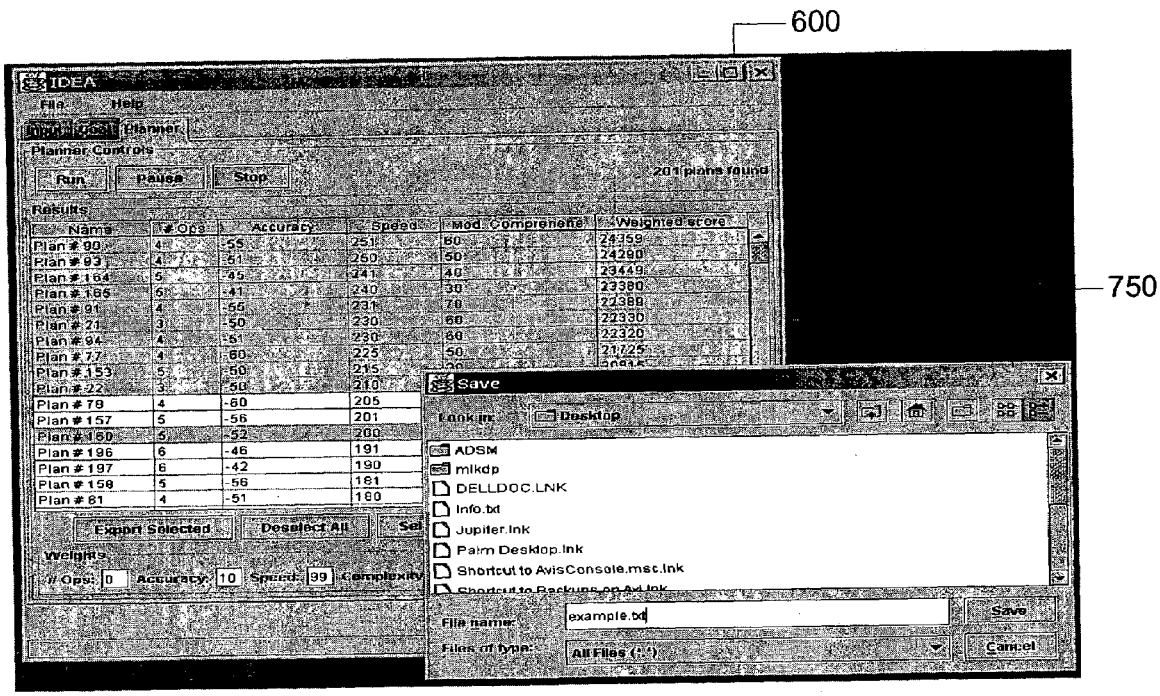
FIG. 16 is a record interface initiated from the display and execution interface of FIG. 14 for recording any plan to a file.

FIG. 15 shows a detailed illustration 700 for plan # 90. As shown in FIG. 14, this plan first randomly samples a subset of the data (smaller data size may lead to a faster induction). Then, it applies fixed-bin discretization to transform the numeric variables into categorical variables. It should be noted that the C4.5 procedure does not require a discretization as a pre-process. However the ontology specifies that discretization can accelerate the induction algorithms, and that the fixed-bin discretization is generally faster than class-based discretization (e.g., the C4.5 procedure is generally much faster without being applied on numeric variables, especially on large data sets). Thereafter, plan # 90 utilizes feature sampling. The ontology specified that the feature sampling may decrease accuracy, but will provide a large increase in speed. The KD process planner would make the tradeoff due to the user's instructions. Finally, the IDEA would use the C4.5 procedure, which the ontology specified to be a fast learning algorithm. Thereafter, in FIG. 16, the user can select any one or more of the valid KD processes/plans/solutions using an export executable plan interface (which can generate computer code), and possibly record the selected one or more plans/solutions using a record interface 750 to a file.

One having ordinary skill in the art would clearly recognize that many other applications of the embodiments of the system and process for assisting with knowledge discovery processes according to the present invention may exist. Indeed, the present invention is in no way limited to the exemplary applications and embodiments thereof described above.

The invention claimed is:

1. A process for providing at least two solutions related to a knowledge discovery from data, comprising:
   a) receiving information regarding operators which are usable for the knowledge discovery from the data;
   b) generating the at least two solutions, each of the solutions including at least one of the operators; and
   c) providing an ability to select at least one of the solutions so as to execute one or more procedures on the data, each of the one or more procedures being associated with the at least one operator of the respective solution.

2. The process according to claim 1, wherein the one or more procedures associated with the respective solution operator perform operations for mining the data.

3. The process according to claim 1, further comprising:
   d) prior to step (a), identifying the data to be subjected to the knowledge discovery; and
   e) extracting meta data from the identified data, the meta data providing characteristics of the identified data.

4. The process according to claim 3, wherein the characteristics of the identified data include types of attributes of the identified data.

5. The process according to claim 4, wherein the attributes indicate that the identified data are at least one of continuous, categorical and incomplete.

6. The process according to claim 3, further comprising:
   f) receiving particular information which identifies a type of the solutions to be generated.

7. The process according to claim 6, further comprising:
   g) prior to step (b), verifying a validity of each of the at least two solutions based on the characteristics of the meta data.

8. The process according to claim 7, wherein step (b) includes the substep of collecting the at least one operator for each of the solutions to produce a list of solutions.

9. The process according to claim 8, wherein the at least one operator is provided in an ontology structure of operators.

10. The process according to claim 9, further comprising:
    h) receiving specifications of the operators provided in the ontology structure, wherein the collecting substep is performed using the specifications.

11. The process according to claim 8, wherein the at least one operator of each of the solutions is a knowledge discovery operator.

12. The process according to claim 8, wherein the at least one operator of each of the solutions is a data mining operator.

13. The process according to claim 8, wherein at least one of the solutions includes at least two operators, and wherein step (c) includes the substep of executing the procedures associated with the operators of each selected one of the solutions.

14. The process according to claim 6, wherein step (b) includes the substep of producing a rank for each of the solutions based on at least one predetermined criterion.

15. The process according to claim 14, wherein the at least one predetermined criterion includes the particular information.

16. The process according to claim 14, further comprising:
    i) prior to step (b), receiving further information for the at least one predetermined criterion.

17. The process according to claim 16, wherein the further information includes weights, each of the weights being associated with a particular attribute of the selected solution.

18. The process according to claim 17, wherein the weights are provided by a user.

19. The process according to claim 17, further comprising:
    j) prior to step (b), generating a score for each of the solutions based on the weights.

20. The process according to claim 19, wherein the score is generated using at least one of a heuristic procedure and an automatic feedback procedure.

21. The process according to claim 20, wherein step (b) includes the substeps of:
    assembling the solutions in a solution list, and
    adding, to the solution list, each solution for which the score was generated.

22. The process according to claim 21, wherein the at least one valid operator is provided in an ontology structure of operators.

23. The process according to claim 22, further comprising:
    k) receiving specifications of the operators provided in the ontology structure, wherein the ranking substep is performed based on the specifications.

24. The process according to claim 14, wherein the ranking substep includes:
    supplying example data to each of the solutions, and
    obtaining the rank for each of the solutions based on at least one of output,
    accuracy and performance of the solutions.

25. The process according to claim 14, wherein step (b) further includes the substep of assembling the solutions based on the rank associated with each of the solutions.

26. The process according to claim 1, further comprising:
    l) generating at least one of an executable code or a source code for at least one of the solutions.

27. The process according to claim 26, wherein the at least one of the executable code and the source code are generated for a particular one of the solutions when it is selected.

28. The process according to claim 26, wherein the at least one of the executable code and the source code executes the respective procedure associated therewith on the data.

29. The process according to claim 1, further comprising:
    l) prior to the generating step, obtaining a template which includes information regarding execution sequences of the operators, wherein the solutions are generated based on the information provided in the template.

30. The process according to claim 29, wherein the information of the template includes restrictions regarding an execution sequence order of each of the operators with respect to one another.

31. The process according to claim 1, wherein a number of the operators in the solutions is not fixed.

32. A process for providing at least one solution related to a knowledge discovery from data, comprising:
    a) receiving information regarding operators which are usable for the knowledge discovery of the data; and
    b) generating the at least one solution which includes a number of the operators, wherein the number of the operators in the solutions is not fixed, and wherein the operators are at least one of data mining operators or knowledge discovery operators.

33. The process according to claim 32, wherein the at least one solution includes a plurality of solutions, at least one of the solutions including at least two of the operators, and wherein the number of the operators of one of the solutions is capable of being different from the number of the operators of another one of the solutions.

34. The process according to claim 33, further comprising the step of:
    c) providing an ability to select at least one of the solutions so as to execute one or more procedures on the data, each of the one or more procedures being associated with the at least one operator of the respective solution.

35. A process for producing a code for at least one solution which is related to a knowledge discovery from data, comprising:

a) obtaining access to the at least one automatically-generated solution which includes operators that are usable for the knowledge discovery from the data; and b) generating the code for associating one of the operators of the at least one automatically-generated solution with another one of the operators of the at least one automatically-generated solution.

36. A software system which, when executed on a processing device, provides at least two solutions related to a knowledge discovery from data, the software system comprising:

a processing subsystem which, when executed on the processing device, configures the processing device to perform the following:

a) receives information regarding operators which are usable for the knowledge discovery from the data, b) generates the at least two solutions, each of the solutions including at least one of the operators, and c) provides an ability to select at least one of the solutions so as to execute one or more procedures on the data, each of the one or more procedures being associated with the at least one operator of the respective solution.

37. The software system according to claim 36, wherein the one or more procedures associated with the respective solution operator perform operations for mining the data.

38. The software system according to claim 36, wherein, when executed on the processing device, the processing subsystem is further capable of:

prior to receiving the information, identifying the data to be subjected to the knowledge discovery, and extracting meta data from the identified data, the meta data providing characteristics of the identified data.

39. The software system according to claim 38, wherein the characteristics of the identified data include types of attributes of the identified data.

40. The software system according to claim 39, wherein the attributes indicate that the identified data are at least one of continuous, categorical and incomplete.

41. The software system according to claim 37, wherein, when executed on the processing device, the processing subsystem is further capable of:

receiving particular information which identifies a type of the solutions to be generated.

42. The software system according to claim 41, wherein, when executed on the processing device, the processing subsystem is further capable of:

prior to the generation of the solutions, verifying a validity of each of the at least two solutions based on the characteristics of the meta data.

43. The software system according to claim 42, wherein the generation of the solutions is performed by collecting the at least one operator for each of the solutions to produce a list of solutions.

44. The software system according to claim 43, wherein the at least one operator is provided in an ontology structure of operators.

45. The software system according to claim 44, wherein, when executed on the processing device, the processing subsystem is further capable of:

receiving specifications of the operators provided in the ontology structure, wherein the collecting substep is performed using the specifications.

46. The software system according to claim 43, wherein the at least one operator of each of the solutions is a knowledge discovery operator.

47. The software system according to claim 43, wherein the at least one operator of each of the solutions is a data mining operator.

48. The software system according to claim 43, wherein at least one of the solutions includes at least two operators, and wherein the ability to select the at least one of the solutions includes a function to execute the procedures associated with the operators of each selected one of the solutions.

49. The software system according to claim 41, wherein the generation of the solutions include a procedure to produce a rank for each of the solutions based on at least one predetermined criterion.

50. The software system according to claim 49, wherein the at least one predetermined criterion includes the particular information.

51. The software system according to claim 49, wherein, when executed on the processing device, the processing subsystem is further capable of:

prior to the generation of the solutions, receiving further information for the at least one predetermined criterion.

52. The software system according to claim 51, wherein the further information includes weights, each of the weights being associated with a particular attribute of the selected solution.

53. The software system according to claim 52, wherein the weights are provided by a user.

54. The software system according to claim 52, wherein, when executed on the processing device, the processing subsystem is further capable of:

d) prior to the generation of the solutions, generating a score for each of the solutions based on the weights.

55. The software system according to claim 54, wherein the score is generated using at least one of a heuristic procedure and an automatic feedback procedure.

56. The software system according to claim 55, wherein the generation of the solutions includes:

assembling the solutions in a solution list, and adding, to the solution list, each solution for which the score was generated.

57. The software system according to claim 56, wherein the at least one valid operator is provided in an ontology structure of operators.

58. The software system according to claim 57, wherein, when executed on the processing device, the processing subsystem is further capable of:

receiving specifications of the operators provided in the ontology structure, wherein the ranking substep is performed based on the specifications.

59. The software system according to claim 49, wherein the production of the ranks includes:

supplying example data to each of the solutions, and obtaining the rank for each of the solutions based on at least one of output, accuracy and performance of the solutions.

60. The software system according to claim 49, wherein the generation of the solutions further includes assembling the solutions based on the rank associated with each of the solutions.

61. The software system according to claim 36, wherein, when executed on the processing device, the processing subsystem is further capable of:

generating at least one of an executable code or a source code for at least one of the solutions.

62. The software system according to claim 61, wherein the at least one of the executable code and the source code are generated for a particular one of the solutions when it is selected.

63. The software system according to claim 62, wherein the at least one of the executable code and the source code executes the respective procedure associated therewith on the data.

64. The software system according to claim 36, wherein, when executed on the processing device, the processing subsystem is further capable of:
prior to the generation of the solutions, obtaining a template which includes information regarding execution sequences of the operators, wherein the solutions are generated based on the information provided in the template.

65. The software system according to claim 64, wherein the information of the template includes restrictions regarding an execution sequence order of each of the operators with respect to one another.

66. The software system according to claim 36, wherein a number of the operators in the solutions is not fixed.

67. A software system which, when executed on a processing device, provides at least one solution related to a knowledge discovery from data, the software system comprising:
a processing subsystem which, when executed on the processing device, configures the processing device to perform the following:
a) receive information regarding operators which are usable for the knowledge discovery of the data, and
b) generate the at least one solution which includes a number of the operators, wherein the number of the operators in the at least one solution is not fixed, and wherein the operators are at least one of data mining operators or knowledge discovery operators.

68. The software system according to claim 67, wherein the at least one solution includes a plurality of solutions, at least one of the solutions including at least two of the operators, and wherein the number of the operators of one of the solutions is capable of being different from the number of the operators of another one of the solutions.

69. The software system according to claim 68, wherein, when executed on the processing device, the processing subsystem is further capable of:
providing an ability to select at least one of the solutions so as to execute one or more procedures on the data, each of the one or more procedures being associated with the at least one operator of the respective solution.

70. A software system which, when executed on the processing device, produces a code for at least one solution which is related to a knowledge discovery from data, comprising:
a processing subsystem which, when executed on the processing device, configures the processing device to perform the following:
a) obtain access to the at least one automatically-generated solution which includes operators that are usable for the knowledge discovery of the data, and
b) generate the code for associating one of the operators of the automatically-generated solution with another one of the operators of the at least one automatically-generated solution.

71. A computer software executable on a processing device to provide at least two solutions related to a knowledge discovery from data, the computer software comprising:
a) a first module which, when executed by the processing device, receives information regarding operators which are usable for the knowledge discovery of the data;
b) a second module which, when executed by the processing device, generates at least two solutions, each of the solutions including at least one of the operators; and
c) a third module which, when executed by the processing device, provides an ability to select at least one of the solutions so as to execute one or more procedures on the data, each of the one or more procedures being associated with the at least one operator of the respective solution.

72. A computer software executable on a processing device to provide at least one solution related to a knowledge discovery from data, the computer software comprising:
a) a first module which, when executed on the processing device, receives information regarding operators which are usable for the knowledge discovery of the data; and
b) a second module which, when executed on the processing device, generates the at least one solution which includes a variable number of the operators, wherein the operators are at least one of data mining operators or knowledge discovery operators.

73. A computer software executable on a processing device to produce a code for at least one solution which is related to a knowledge discovery from data, the computer software comprises:
a) a first module which, when executed on the processing device, obtains access to the at least one automatically-generated solution which includes operators which are usable for the knowledge discovery of the data; and
b) a second module which, when executed on the processing device, generates the code for associating one of the operators of the at least one automatically-generated solution with another one of the operators of at least one automatically-generated solution.

74. The process according to claim 1, wherein at least one of the solutions is a plan for generating at least one knowledge discovery procedure.

75. The process according to claim 1, wherein the ability to select at least one of the solutions is provided to a user.

76. The software system according to claim 36, wherein at least one of the solutions is a plan for generating at least one knowledge discovery procedure.

77. The software system according to claim 36, wherein the ability to select at least one of the solutions is provided to a user.

78. The computer software according to claim 71, wherein at least one of the solutions is a plan for generating at least one knowledge discovery procedure.

79. The computer software according to claim 71, wherein the ability to select at least one of the solutions is provided to a user.

* * * * *